United States Patent [19] [11] 3,720,790

Watson et al. [45] March 13, 1973

[54] DATA TRANSMITTING SYSTEM

[75] Inventors: George A. Watson; Arthur H. Hamond, Jr., both of Tustin, Calif.

[73] Assignee: AMP Incorporated, Harrisburg, Pa.

[22] Filed: Feb. 22, 1971

[21] Appl. No.: 96,335

[52] U.S. Cl. .......................... 179/15 AL, 179/15 AW
[51] Int. Cl. .................................................. H04j 3/08
[58] Field of Search .........179/15 AL, 15 BS, 15 AN, 15 AP, 179/15 AW; 325/38 A; 178/69.5 R

[56] References Cited

UNITED STATES PATENTS

| | | | |
|---|---|---|---|
| 2,403,210 | 7/1946 | Butement | 179/15 AW |
| 2,406,165 | 8/1946 | Schroeder | 179/15 AL |
| 2,651,677 | 9/1953 | Lair | 179/15 AL |

*Primary Examiner*—Ralph D. Blakeslee
*Attorney*—William J. Keating et al.

[57] ABSTRACT

The specification discloses a two conductor data transmission system linking a plurality of sending stations to a plurality of receiving stations. A master clock connected to the cable determines consecutive time periods each consisting of three consecutive intervals. The master clock holds the cable at one voltage during the first of each three intervals and at zero voltage during the third thereof and monitors the cable for voltage changes during the second one of the intervals. Each station has a counter which counts the first intervals and when a count designated to the respective station is reached the station is operatively connected to the cable to supply a voltage signal thereto during the respective second interval of the time period, or to receive a voltage signal therefrom.

17 Claims, 6 Drawing Figures

Figure 1:
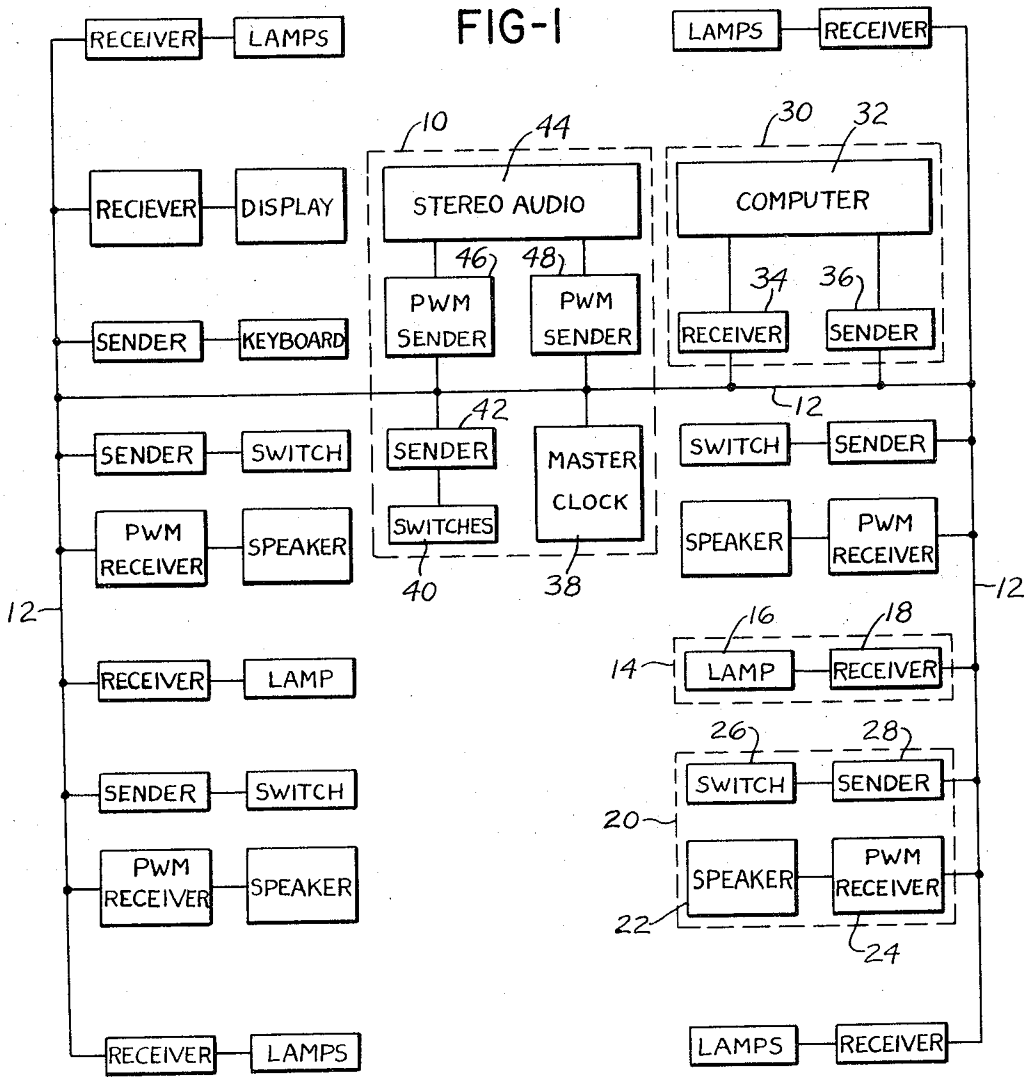

INVENTORS
GEORGE A. WATSON
ARTHUR H. HAMMOND, JR.

INVENTORS
GEORGE A. WATSON
ARTHUR H. HAMMOND, JR.

INVENTORS
GEORGE A. WATSON
ARTHUR H. HAMMOND, JR.

INVENTORS
GEORGE A. WATSON
ARTHUR H. HAMMOND, JR.

DATA TRANSMITTING SYSTEM

The present invention relates to a system for remote switching and for the transmission of information and data between a master station and remote stations.

More particularly still, the present invention relates to a system of the nature referred to in which a master station is connected with a plurality of remote stations by a single co-axial cable or by simple two-wire cables while each remote station can be independently controlled by signals supplied to the cable or can independently feed voltage signals to or receive voltage signals from the cable. The voltage signals, or pulses, are in the form of binary bits or width modulated pulses and can, thus, effect control operations or transmit data.

The control of remote stations from a master station can readily be accomplished by a complex wiring system but such an arrangement becomes extremely expensive and complex. In a great many cases, continuous connection of a master station with a remote station is not required because the remote station may merely require control by turning a switch on or off and it is only during the interval of actuating the switch that a connection between the master station and the remote station is necessary.

Further, in the case of data or information transmission, this can ordinarily be accomplished in the form of digital pulses or in the form of pulses which vary in duration, namely, width modulated pulses and which can also occur at intervals so that even with data or information transmission it is possible to connect the master station with a remote station only during specific intervals during which the presence or absence or duration of a data pulse can be determined. By assigning respective time intervals from a group thereof to respective remote stations, each remote station will be able, during its assigned time interval, to transmit data to, or to receive data, or control signals to the master station.

It will be evident that the above referred to connection between the master station and the remote stations can be accomplished by a co-axial cable, or by means of a simple two-wire network interconnecting the master station with the remote stations because, at any instant, a connection between the master station and any one remote station is effective.

With the foregoing in mind, it will be apparent that a primary objective of the present invention is the provision of a remote switching system and a system for transmitting and accepting data in which a master station can be interconnected with a plurality of remote stations by a simple co-axial or two-wire network.

Another object of this invention is the provision of a system in which a master station is in controlling or data transmitting communication with a plurality of remote stations and wherein communication between the master station and any of the remote stations does not interfere with the communication between the master station and any others of the remote stations.

Still another object of the present invention is the provision of a system of the nature referred to in which all of the stations, including the master control station and the remote stations are periodically brought into a condition of synchronization so that reliable results will be had at all times.

BRIEF DESCRIPTION OF THE INVENTION

According to the present invention, a master control station is provided which includes a clock which establishes time periods, or time slots, of uniform duration, each divided into at least three consecutive intervals. The clock is connected with the cable by a circuit which is under the control of the clock and which is operable to supply voltages to the cable at respective levels during the three intervals of each time period, or time slot. In practice, the voltage across the conductor of the cable is a certain positive or negative valve during the first interval while no voltage is supplied during the second interval and during the third interval both conductors are held at the same voltage level, usually ground. During the second interval, the cable voltage is under the control of signals to be transmitted.

Each remote station, in turn, has a clock which selects the time slot assigned to the respective station, and has circuitry connecting the clock to the cable and is arranged either to receive signals from or to transmit signals to the master control station during the aforementioned second interval of the respective time slot. The time periods, or time slots, are at least equal in number to the number of remote stations with which individual communication is to be had and one such time slot is assigned to each such remote station.

By providing for as many time slots as there are remote stations to be controlled or monitored, each remote station will have a certain individual time slot during the second interval of which it is in communication exclusively with the master or control station for transmission of data or command therebetween.

The exact nature of the present invention and the several objectives and advantages thereof will become more apparent upon reference to the following detailed description taken in connection with the accompanying drawings in which:

FIG. 1 schematically illustrates one arrangement wherein a plurality of remote stations are maintained in communication with a main control or master station.

Figure 2:
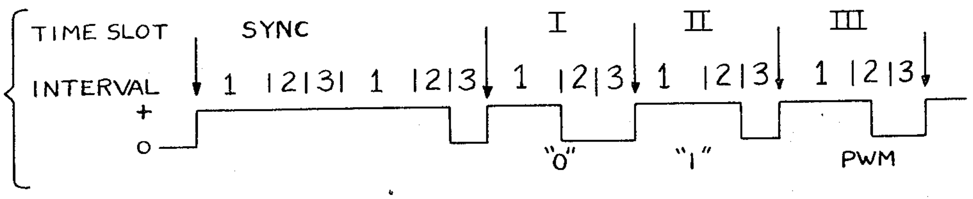

FIG. 2 schematically illustrates a typical transmission cabled voltage wave form as it would appear on the cable in FIG. 1 interconnecting the master station with the remote stations.

Figure 3:
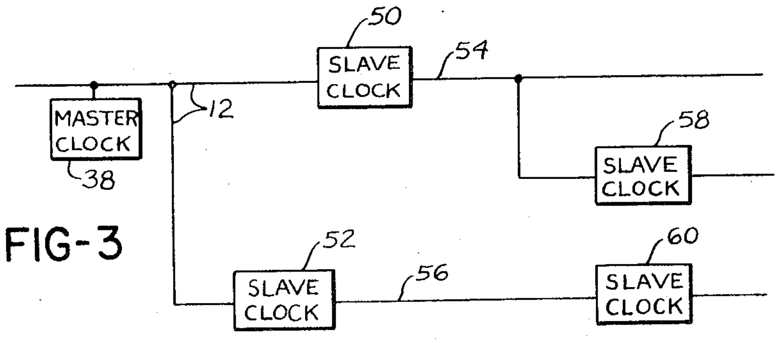

FIG. 3 is a schematic representation of one manner in which the system could be modified to compensate for cable reactance when the system is of such a size that the cable reactance becomes an important consideration.

Figure 4:
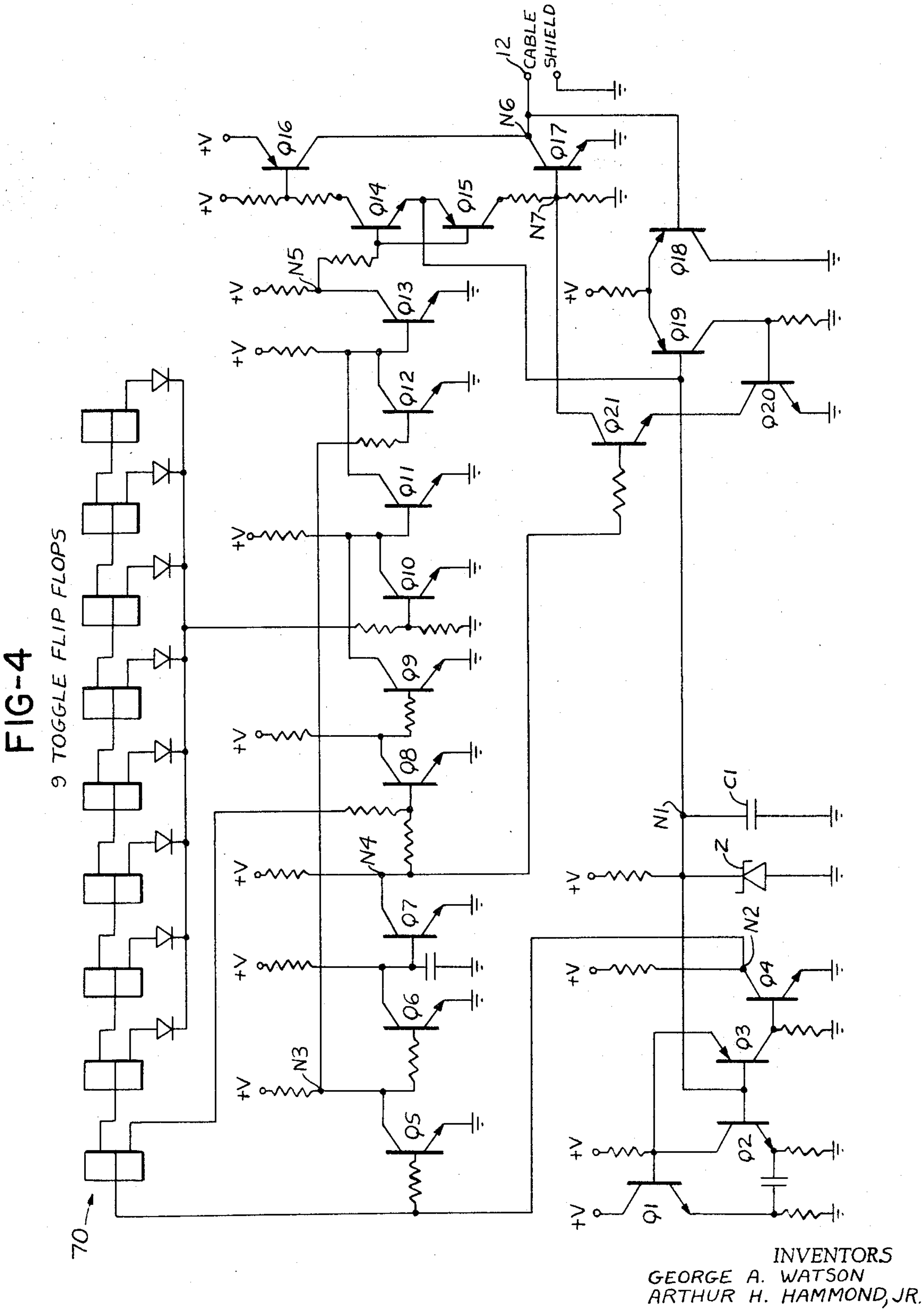

FIG. 4 schematically illustrates details of the master clock circuit of the system of FIG. 1.

Figure 5:
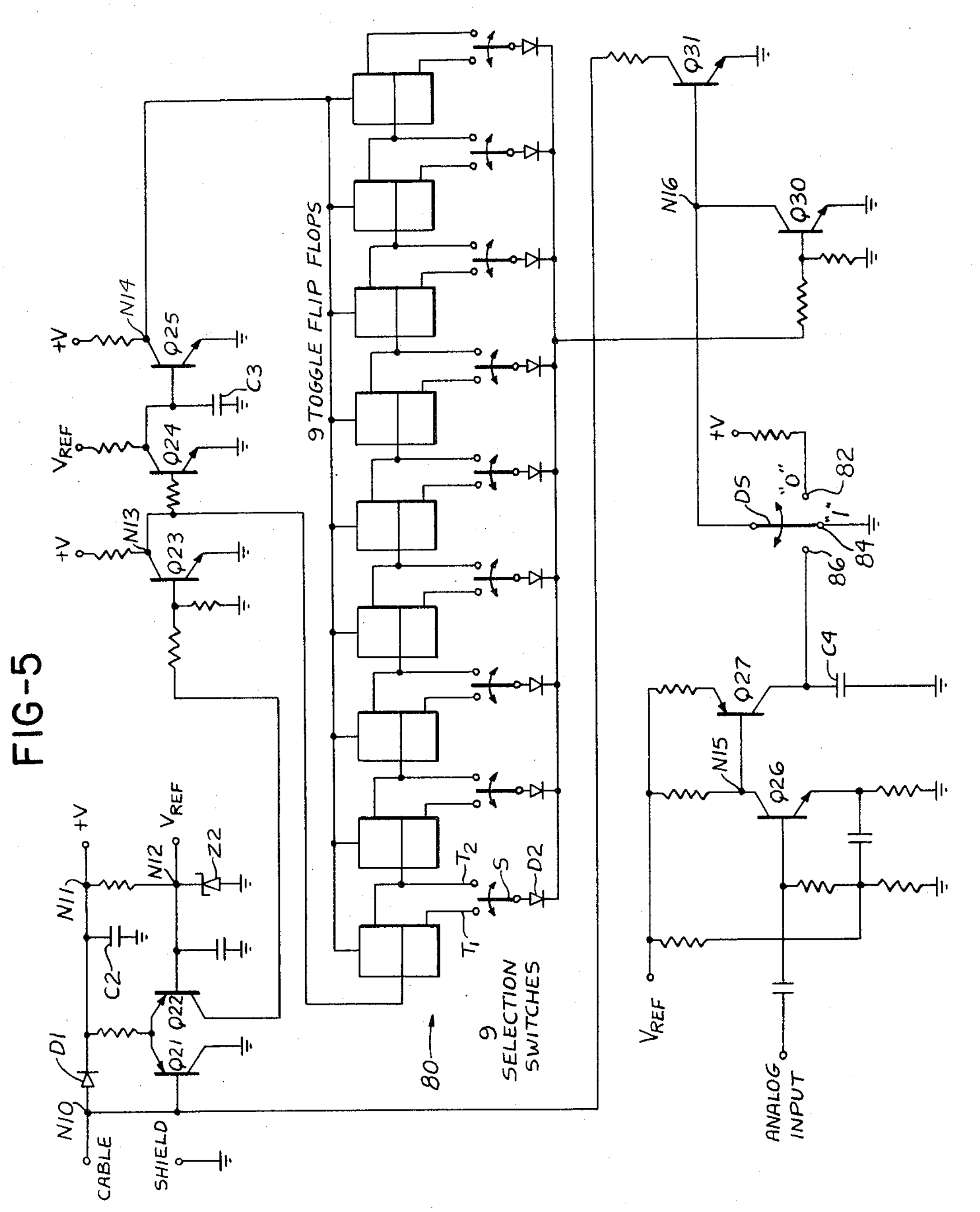

FIG. 5 schematically illustrates the circuit of a typical sending transceiver that could be included in the system of FIG. 1.

Figure 6:
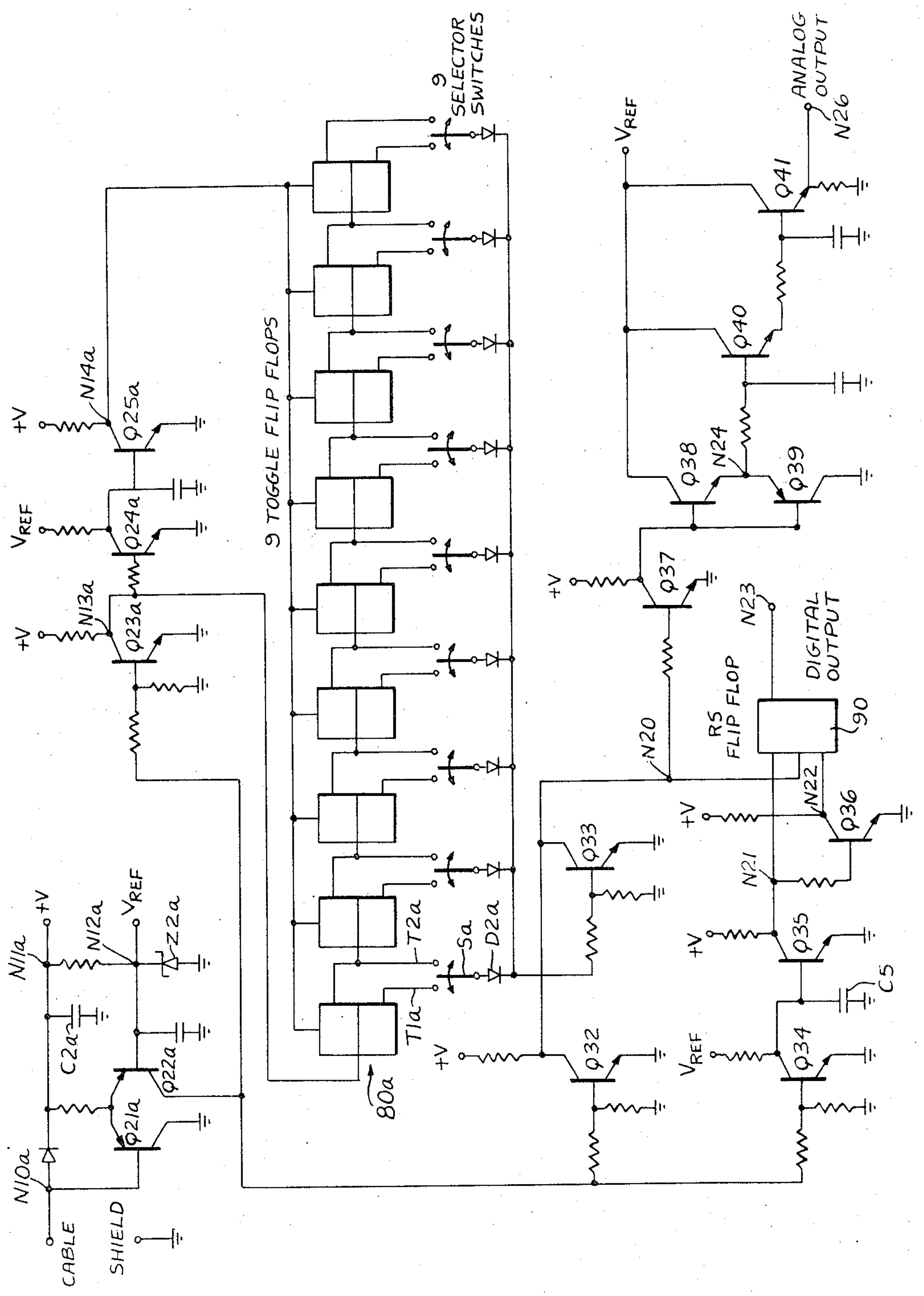

FIG. 6 schematically illustrates the circuit for a receiving transceiver such as could be incorporated in the system of FIG. 1.

Referring to the drawings somewhat more in detail, the system illustrated in FIG. 1 comprises a master or control station indicated by the dashed outline 10 and a plurality of remote stations arranged in distributed relation and all connected to an interconnecting cable 12 which, as mentioned previously, may be a two-wire cable or a co-axial cable. An example of a remote station is indicated by the dashed outline at 14 and will be seen to comprise a lamp 16 and a receiver element 18 that controls the energization of the lamp.

Another remote station is indicated by the dashed outline 20 and will be seen to comprise a speaker 22, a receiver 24 which receives signals from cable 12 and supplies the input to the speaker, a switch 26 which can comprise an on-off and selector switch, and a sender 28 connecting switch 26 with cable 12.

Still another type of remote unit is illustrated in the dashed outline at 30 wherein there is included a computer 32 having an input supplied by a receiver 34 which, in turn, receives signals from cable 12. Computer 32 supplies its output to a sender 36, the output of which, in turn, is connected to cable 12.

Returning to the master control station, this will be seen to comprise a master clock 38 connected to cable 12, a switch box 40 containing switches and connected through a sender 42 to cable 12, and a player such as a stereo audio unit 44 having two outputs connected through respective pulse width modulating senders 46 and 48 with cable 12.

The others of the remote stations in FIG. 1 are not specifically referred to because it is believed that the remote stations above described represent an ample number of typical instances to clarify the general nature of the present invention.

It will be apparent from the foregoing that the one master clock 38 serves the entire system although if the system becomes so extensive, and the cable 12 of such length, that the reactance thereof becomes a problem, the expedient illustrated in FIG. 3 may be resorted to wherein master clock 38 has the cable 12 leading therefrom connected to the one sides of a plurality of slave clocks, two thereof being indicated at 50 and 52, and each of which has respective slave sides 54 and 56 which precisely track voltage variations on cable 12. The system can be extended still further by cascading the slave clocks as shown at 58 and 60.

The present invention provides an arrangement whereby senders and receivers can be located anywhere along the distributing cable and each sender or receiver is provided with a specific time slot designation. The respective time slots can be used indiscriminately for either analog or digital data. The analog data, as mentioned, is in the form of width modulated pulses while the digital data is in the form of binary bits.

Signals can be combined by the use of "OR" gates and multiple senders can thereby be assigned to the same time slot and any one sender can thereby transmit a signal during the respective time slot.

The manner in which the time slots and the intervals therein are arranged is shown in FIG. 2 wherein successive time slots are indicated by Roman numerals I, II and III and within each time slot three intervals are designated as 1, 2 and 3. It will be seen that interval 1 is the longest of the three but the relative lengths of the intervals could be anything desired.

At the left of FIG. 2 an interval will be noted in which a certain voltage, in this case a positive voltage, is maintained across the cable conductive for a length of time greater than one time slot. This is the synchronizing pulse and is marked "SYNC" in the drawing. In the drawing it will be noted that the voltage varies between "O" and a certain positive level but it will be understood that the voltage could vary between "O" and a negative level if so desired. The voltage designated is the voltage standing across the two conductors of the cable whether it be a two-wire cable or a co-axial cable.

Commencing with the time slot marked I, it will be seen that the voltage across the cable conductor is positive during the entire duration of the first interval, marked 1, and that at the end of interval 1, the voltage can go to "0" where it will remain during the duration of intervals 2 and 3 and again go positive at the beginning of interval 1 of time slot II. The master clock does not control the voltage during interval 2 directly, but does control it during interval 3. The control of the voltage during interval 2 is effected by a signal to be transmitted. In time slot I, no signal is being transmitted and the voltage in interval 2 thereof is zero. In the transmission of analog or digital data, this would indicate a "0."

As to time slot II, it will be seen that the cable voltage remains positive throughout interval 2 which indicates the transmission to or from the respective remote station of a value of "1."

As to time slot III, this is a time slot during which analog information is transmitted and it will be seen that a part only of interval 2 thereon has the cable positive and the remainder thereof has the cable at zero voltage. The portion of interval 2 during which the cable is positive represents the information to be transmitted.

Turning now to FIG. 4, the circuit diagram for the master clock circuit is illustrated. In this circuit, a source of voltage is indicated at various points in the circuit as +V and at point, or terminal, N1 in the circuit, an accurate DC voltage of about +(V/2) is maintained by Zener diode Z connected between point N1 and ground and in parallel with a stabilizing capacitor C1.

Transistors Q1, Q2, Q3 and Q4 in FIG. 4 make up a multivibrator, the output signal of which at terminal N2 is at ground potential, due to conduction of Q4, during the first interval of each time slot and goes positive, due to nonconduction of Q4, during the second and third intervals of each time slot.

Terminal N2 is connected to the input terminal of a 512 state counter indicated generally at 70 and consisting of nine serially connected toggle flip-flops. The counter changes state at the beginning of the first interval of each time slot, namely, when terminal N2 goes to ground.

Transistor Q5 is also connected to terminal N2 and inverts the multivibrator output supplied to the said terminal. Transistor Q5 is connected in controlling relation to a single shot circuit comprising transistors Q6 and Q7 and which circuit generates a signal at terminal N4 which goes positive during the first and second intervals of each time slot and goes to ground during the third interval of each time slot.

The logic circuitry consisting of transistors Q8 through Q13 generates a signal at terminal N5 which is positive when the master clock drives the cable positive and it is negative when the master clock does not drive the cable positive.

Transistors Q14 through Q17 directly control the driving of the cable by controlling the voltage at a terminal N6. This terminal goes positive when Q16 goes conductive, unless, at that time, Q17 is also conducting. The conduction of Q17 is under the control of the voltage at terminal N7 and when this terminal, and terminal N5, both go to ground, the cable is not driven in either direction by the master clock.

The circuitry including transistors Q18 and Q19 is a threshold detector which senses the cable voltage and determines whether it is above or below the reference voltage at terminal N1. Transistors Q20 and Q21 form an inhibit circuit which prevents the cable from being driven to ground by the master clock during the second interval of a clock until a sending transistor to be described hereinafter has driven the cable voltage to a level below that of the reference voltage at terminal N1.

The master clock includes an arrangement for developing the SYNC pulse periodically, arrangements of this nature being known and including a counting arrangement so that the SYNC pulse will occur only after a certain number of the time periods or time slots, equal in number at least to the number of remote stations, have transpired. Each SYNC signal brings the receiving transceivers and sending transceivers into exact synchronization with the master clock so that the respectime time slots allotted thereto can be counted off during the interval between successive SYNC pulses.

Turning now to FIG. 5, a typical sending transceiver is illustrated. The function of the sending transceiver is to identify the time slot assigned thereto and to enter data onto the cable during the second interval of the respective time slot. The synchronizing signal above referred to and generated in the master station is detected in each sending transceiver is employed to reset a binary counter which then counts the time slots by counting the positive going transitions occurring at the beginning of the first interval of each time slot which are supplied to the cable by the circuitry under the control of the master clock. When the counter has reached the pre-selected count, which corresponds to the time slot assigned to the respective sending transceiver, the sending transceiver is effectively connected to the cable.

During the second interval of the respective time slot, the circuit under the control of the master clock is supplying no signal to the cable. If a digital "0" is to be transmitted, the sending transceiver causes the cable to go to ground at the beginning of the said second interval which can be done because the circuitry in the master station is supplying no signal to the cable but has, rather, effectively electrically isolated the conductors of the cable from each other.

If a digital "1" is to be transmitted, the sending transceiver supplies no signal to the cable and does not send the cable to ground and the cable will only go to ground at the end of the second interval when the master station resumes control thereof and supplies a signal of zero voltage to the cable. If analog data is to be transmitted, in the form of a width modulated pulse, the sending transceiver sends the cable toward ground at a time during the second interval which is proportional to the analog information to be transmitted. As a matter of convenience, one conductor of the cable is grounded and the voltage level of the other conductor is adjusted to supply signals to the cable. In the case of a co-axial cable, the sheath is grounded. In the description it will, therefore, be understood that a signal of a certain voltage supplied to the cable establishes the voltage of the signal between the conductors of the cable.

In FIG. 5, the cable is connected between ground and a terminal N10. If the cable is a co-axial cable, the shield or outer conductor is connected to ground and the center conductor is connected to terminal N10. Diode D1 has its positive side connected to a plus voltage source marked +V in FIG. 5 with a capacitor C2 connecting the negative side of diode D1 to ground. Diode D1 permits charging of capacitor C2 when the cable goes positive and which may provide operating power for the transceiver.

Terminal N11 is connected via a resistor with a terminal N12 and between terminal N12 and ground is a zener diode Z2 which establishes a reference voltage and which reference voltage is maintained at a level independent of the power supplied to terminal N11.

The transistors shown at Q21, Q22 and Q23 form a threshold detector that determines when the cable is being driven either in the positive direction, or toward ground. When the cable is driven positive, the terminal N13 connected to the collector of Q23 goes to ground, due to conduction of Q23 and, when the cable goes toward ground, Q23 does not conduct and terminal N13 goes positive due to the connection thereto of a positive voltage source by way of a resister.

Transistors Q24 and Q25 form a single shot which measures the length of time that the cable is positive. If the cable is positive for a period of time longer than one time slot, which occurs only on a sync signal, capacitor C3 charges up to the level which will cause transistor Q25 to conduct and thereby cause terminal N14 to go to ground potential. Terminal N14 is connected to the reset terminals of a counter arrangement generally indicated at 80 and consisting of nine toggle flip-flops. Following the resetting of the counter, positive going transitions of the cable as reflected at terminal N13 will cause the counter to count. The positive going transition occurs at the beginning of each time slot when the circuit under the control of the master clock drives the cable positive for the first interval in each time slot.

Each flip-flop of the counter has a pair of terminals T1 and T2 and associated with the terminals is a selector switch S which can be moved into engagement with either of the said terminals and each switch S is connected through a respective diode D2 with a wire leading to the base of a transistor Q30.

The switches S are employed for selecting the time slot assigned to the respective transceiver. Other known selection devices and switching arrangements are possible. Each switch S can also have a center position in which it is not connected to either of the respective terminals T1 or T2 in which case multiple time slots are assigned to the respective transceiver.

In operation, transistor Q30 is driven to conduction during every time slot except for the time slot assigned to the respective transceiver. When the counter counts up to the assigned time slot, the positive bias on the base of transistor Q30 is interrupted and the transistor ceases to conduct thereby releasing the base of a transistor Q1 from ground. Terminal N16 is the interconnecting terminal between the collector of transistor Q30 and the base of transistor Q31 and is also connected to a data switch blade DS. This switch blade can be moved into engagement with a terminal 82 connected to a positive voltage source so that when Q30 ceases to conduct transistor Q31 will go to conduction. If, however, the blade is closed on the grounded terminal 84, transistor Q31 will not go to conduction when transistor Q30 ceases to conduct. By adjustment of switch blade DS, a "1" or a "0" can be selectively chosen.

Specifically, when the switch engages terminal 82, a "0" is transmitted and when the blade is in contact with terminal 84, a "1" is transmitted.

The collector of transistor Q31 is connected through a resister with terminal N10 and during the second interval of the respective time slot, if transistor Q31 does not go to conduction, the cable stays positive whereas if it does go to conduction, the cable will go toward ground. As explained in connection with FIG. 2, if the cable goes to ground, a "0" is being transmitted and if the cable does not go to ground, a "1" is being transmitted.

Referring back to FIG. 4, a transition of the cable voltage toward ground is detected by the threshold detector consisting of transistors Q18 and Q19 which will cause the circuitry associated with the master clock to drive the cable to ground once a sending transceiver has caused the cable to be biased toward ground potential.

The blade DS has a third position of engagement with a terminal 86 leading to the collector of a transistor Q27. The circuit consisting of transistors Q26 and Q27 is for the purpose of supplying analog information in the form of a pulse width modulated signal. Transistor Q26 is a voltage amplifier, the output of which, at terminal N15, is supplied to the base of transistor Q27 to control the collector current thereof. The collector current from transistor Q27 charges a condenser C4 and when the threshold voltage of the base-emitter junction of Q31 is reached, Q31 will go to conduction and drive the cable toward ground. The circuitry containing transistors Q26 and Q27 can thus provide for modulation of the cable voltage as shown in time slot III of FIG. 2 in which the portion of the second interval thereof which is positive is representative of the information being transmitted.

Turning now to the receiving transceiver of FIG. 6, this circuit will be seen to be identical with that of the sending transceiver, in part. Those parts of the circuit of FIG. 6 which are identical with those of the circuit of FIG. 5 bear the same reference numerals with the addition of a subscript *a*.

In FIG. 6, the cable is connected between ground and terminal N10*a* and includes the same transistors Q21*a*, Q22*a* and Q23*a* together with transistors Q24*a* and Q25*a* and a counter 80*a* in the form of nine toggle flip-flops each having respective output terminals T1*a* and T2*a* and respective selector switch blade S*a* feeding the positive side of a respective diode D2*a*.

The negative sides of diodes D2*a* are connected to the base of a transistor Q33 which, as in the case of transistor Q30 of FIG. 5, conducts during nonassigned time slots and goes to nonconduction only during the respective assigned time slot. When Q33 is conducting, terminal N20 is held at ground and the input of the clock pulse to the RS flip-flop at 90 is inhibited. However, during the assigned time slot Q33 is not conducting, terminal N20 is under the control of the voltage at the collector of transistor Q32. In the first interval of the respective time slot, at which time the cable is positive, Q32 is driven to conduction and terminal N20 is grounded. During the third interval of the respective time slot, the cable is always grounded, and Q32 is nonconducting and the terminal at N20 goes positive. At the beginning of each time slot the cable goes positive and makes Q32 conductive to return terminal N20 to ground and this negative going transition of N20 serves as a clock for RS flip-flop 90.

Q34, Q35 and Q36 form a single shot for data evaluation and controls terminals N21 and N22. The voltage values appearing at N21 find their complement at N22 and vice versa. This data is gated into flip-flop 90 by the clock pulse appearing at terminal N20. The data is stored in the flip-flop until the next assigned time slot appears and data is again copied into the flip-flop. The digital output from flip-flop 90 appears at terminal N23.

The single shot circuitry consisting of transistors Q34, Q35 and Q36 detects the data in the following manner. During the initial portion of the designated time slot for the respective receiving transceiver the cable is positive and Q34 conducts and discharges capacitor C5, connected between the collector of Q34 and ground, to ground. During the third interval of the respective time slot, the cable is grounded and Q34 does not conduct and the capacitor is permitted to charge toward the reference voltage connected to the capacitor and to the collector of Q34. If a digital "0" is being transmitted on the cable, the cable will be at ground during the second interval of the time slot, and the capacitor will have sufficient time to cross the threshold voltage of the base-emitter junction of transistor Q35, causing Q35 to go to conduction and Q36 to go to nonconduction at the end of the respective time slot.

If, however, a digital "1" is being transmitted on the cable, the cable will be positive during the second interval of the time slot, and capacitor C5 will not have sufficient time to exceed the threshold voltage of the base-emitter junction of transistor Q35 and transistor Q35 will be nonconducting and transistor Q36 will be conducting and a digital "1" will be stored in flip-flop 90 when the voltages at N21 and N22 are gated into the flip-flop by the clock pulse from terminal N20. The digital information supplied to flip-flop 90, as mentioned, appears at terminal N23 and can be employed for any desired purpose such as turning a switch on or off, or putting information into a computer or for any other purpose. In the case of the circuit of FIG. 6, it will be apparent that the information is transmitted on the cable to the receiving transceiver as opposite to the situation in the circuit of FIG. 5 where information was being supplied to the cable by the sending transceiver.

If analog data is being transmitted on the cable during the time slot assigned to the respective receiving transceiver, it is detected and processed in the circuitry consisting of transistors Q37, Q38, Q39, Q40 and Q41 and supplied to terminal N26 as an analog output. The circuit operates in the following manner. The signal at terminal N20 is a positive going pulse which appears during the second interval of the time slot assigned to the respective receiving transceiver and the pulse width thereof is proportional to the analog voltage being transmitted.

This has been discussed in connection with FIG. 5 wherein transistors Q26 and Q27 process analog data and modulate the width of an output pulse in conformity with the data. The said pulse in the circuit of FIG. 6 is shaped by the circuitry consisting of transistors Q37, Q38 and Q39 to develop a signal at terminal N24. The signal at N24 has the same width as the pulse at terminal N20 and has as limits the reference voltage connected to the connector of Q38 and ground potential connected to the collector of Q39.

The wave form at terminal N24 can be considered as an approximation of a string of impulse functions. Frequency content of this wave form for frequencies under the Nyquist criterion approximates the corresponding frequency content of the transmitted analog signal. The circuitry consisting of transistors Q40 and Q41, following terminal N24, is a two stage low pass filter designed to attenuate frequencies above the Nyquist criterion with the filtered signal appearing as an analog output at terminal N26.

Returning for the moment to FIG. 1, it will be seen that the master station at 10 includes, by way of example, a sender at 42 and connected thereto switches at 40. This portion of the master station might send, for example, digital signals for causing the opening and closing of switches for lamps and the like. The stereo audio unit 44 in the master station via its senders 46 and 48 would, on the other hand, supply width modulated pulses to the cable.

The remote station indicated at 30 and forming a computer would probably receive digital data from the cable via its receiver 34 and return digital data to the cable via its sender 36.

Some of the important features of the system of the present invention can be expressed briefly as follows:

1. Senders and receivers can be located anywhere along the cable. Time slot designations are wired into each transceiver.

2. Time slots can be used indiscriminately for either analog or digital data. The binary signals are represented by the extremes of the analog PWM range.

3. The channel capacity varies inversely with cable length. Assuming 200Ω Ωsender switches and 50 pf/ft cable, the capacity is 20,000 time slots/second for 1,000 feet of cable.

4. Signals can be ORed together by assigning multiple binary senders to the same time slot. Any designated sender can drive the cable to ground.

5. Senders do not drive the cable negative, only toward ground. Once the cable is halfway to ground, a master or slave clock will take over in driving to ground. The output driver for a sender is therefore a medium impedance (200Ω) MOS switch to ground. A sender which requires increased noise immunity can switch an impedance to the line while sending a ONE.

6. It is possible for the transceivers to draw their operating power (not load power) from the cable. The cable is driven negative by low impedance drivers for at least a 20 percent duty cycle.

7. A transceiver can locate his assigned time slot by counting negative transitions of the line. The sync is used to initialize a modulo N counter in the transceiver to a state corresponding to its time slot. The time slot is signaled when the counter passes through a reference state. The cable signal shot in the transceiver can be used to identify the sync.

8. A binary sender can switch its driver to the cable at the beginning of the assigned time slot. The master or slave clock will hold the cable negative until the 20 percent point. Except to identify the sync, a binary sender does not need to generate an internal time reference.

9. A binary receiver can read data by averaging the cable voltage between negative transitions. A ZERO averages above and a ONE below the midpoint of the cable drive voltages.

10. Transceivers requiring a local clock synchronized to the cable can phase lock onto the negative transition of the cable.

Modifications may be made within the scope of the appended claims.

What is claimed is:

1. In a system for transmitting data and the like between a plurality of stations; a two conductor cable, first means including a master clock connected to said cable and operable for supplying chronologically spaced sync signals at a first voltage thereto and for dividing the time between said sync signals into consecutive time periods each consisting of three consecutive intervals, said first means supplying a first signal at said first voltage to said cable during each said first interval and supplying no signal to said cable during each said second interval and supplying a second signal at zero voltage to said cable during each said third interval, at least one receiving station and at least one sending station connected to said cable, each station including a counter adapted to reset in response to a sync signal and registering a count in response to each said first signal, each station comprising signal processing means having input means to receive voltage signals and output means to supply voltage signals, selector means in each station connected to the counter therein and adjustable for selecting at least one count corresponding to the time period assigned to the respective station, inhibiting means in each station under the control of said selector means and connected to said signal processing means and effective for inhibiting the output from the respective output means except on said selected count during which said inhibiting means is ineffective, the output means of said sending station being connected to said cable and being adapted for supplying zero going signals thereto during the second interval of the respective time period when the respective inhibiting means is ineffective, and the input means of said receiving station being connected to said cable and being responsive to zero going signals received therefrom during the second interval of the respective time period when the respective inhibiting means is ineffective.

2. A system according to claim 1 in which said first means includes means operable for monitoring the cable voltage during each said second interval and operable in response a zero going change in cable voltage to supply a said second signal at zero voltage to said cable during the remainder of the respective second interval.

3. A system according to claim 1 in which said sync pulse is of longer duration than a said time period and each remote station includes counter resetting circuitry connected between the cable and the counter reset terminal means and operable for supplying a counter resetting signal to the reset terminal means of the respective counter only upon the supply thereto of a voltage signal of longer duration than a said time period.

4. A system according to claim 1 in which said zero going voltage signals are totally absent during a said second interval or are present throughout the said interval and are thus in the form of binary bits.

5. A system according to claim 1 in which said zero going voltage signals are in the form of width modulated pulses having a variable duration proportional to the analog values of data transmitted during a said second interval.

6. A system according to claim 1 in which the output means of said signal processing means of said receiving station comprises digital output means in the form of an output terminal of a flip-flop, a zero going voltage signal on said cable during the entirety of a said second interval developing input signal means for said flip-flop, means for supplying said first signals on said cable to said flip-flop as gating clock pulses, and said inhibiting means preventing the supply of said gating pulses to said flip-flop except on the said selected count.

7. A system according to claim 1 in which the output means of said signal processing means of said receiving station comprises analog output means, said signal processing means developing an output in conformity with zero going signals on said cable having a duration less than the entirety of a said second interval.

8. A system according to claim 1 in which one conductor of said cable is grounded.

9. A system according to claim 1 in which one conductor of said cable is grounded, and said first voltage is positive.

10. A system according to claim 1 in which one conductor of said cable is grounded, and said first voltage is negative.

11. A system according to claim 1 in which said first intervals are longer than said second and third intervals.

12. A system according to claim 1 in which said first means includes at least one slave clock interposed in said cable and tracking said master clock thereby to reduce the amount of cable reactance between a said station and a said clock.

13. The method of transmitting data and the like between a plurality of stations by a two conductor cable which comprises; periodically supplying sync pulses to said cable, supplying a plurality of uniformly spaced first pulses at a first voltage to said cable between successive sync pulses, supplying second pulses at zero voltage to said cable immediately prior to said first pulses and leaving the cable free to receive signals in the interval between each said first pulse and the next following second pulse, supplying width modulated zero going data pulses to said cable during the said interval from sending station means distributed along the cable, and receiving said data pulses from the cable in receiving station means distributed along said cable.

14. The method according to claim 13 which includes counting said first pulses and releasing data pulses from a sending station to said cable and operatively receiving the data pulses in a receiving station only during the interval following the first pulse corresponding to a count assigned to the respective stations.

15. The method according to claim 14 which includes monitoring said cable during each said interval and supplying a said second pulse to said cable immediately upon the detection of a said zero going pulse on the cable.

16. The method according to claim 14 which includes assigning at least one respective count to each of a plurality of sending stations and the same said counts to the corresponding receiving stations.

17. The method according to claim 14 which includes initiating the counting of said first pulses at the termination of each sync pulse.

* * * * *